UNITED STATES PATENT OFFICE.

HEYMAN ROSENBERG, OF NEW YORK, N. Y.

TOOL-HANDLE.

1,384,154.  Specification of Letters Patent.  Patented July 12, 1921.

Application filed December 15, 1919. Serial No. 344,770.

*To all whom it may concern:*

Be it known that I, HEYMAN ROSENBERG, a citizen of the United States, residing at New York, in the county of New York and State of New York, have invented certain new and useful Improvements in Tool-Handles; and I do hereby declare the following to be a full, clear, and exact description of the invention, such as will enable others skilled in the art to which it appertains to make and use the same.

The present invention relates to handles for tools, such as files and the like, and has for an object to provide a handle which will not split when securing the tool to the handle and which will rigidly and firmly hold the tool to the handle.

Another object is to provide a handle with thread cutting means adapted to engage and cut threads in the tang of a tool and to grip the threaded portion of the tang for binding the tang in the tool handle.

A further object is to provide a novel construction of thread cutter for the handle and a novel mounting of the thread cutter on the handle for protecting the handle against splitting and for admitting the economical and ready assemblage of the parts.

With these and further objects in view as will in part hereinafter become apparent and in part be stated, the invention comprises certain novel constructions, combinations and arrangements of parts as subsequently specified and claimed.

In the accompanying drawings,—

Figure 1 is a longitudinal section through a tool handle constructed according to this invention and as applied to a file.

Fig. 2 is a transverse section through the handle taken substantially on the line 2—2 of Fig. 1.

Fig. 3 is an end view of the handle, showing the ferrule and other parts assembled.

Fig. 4 is an elevation of one of the casing or retaining sections used for holding the thread cutter in position, and Fig. 5 is a perspective view of the casing sections assembled and ready for insertion in the handle.

Referring to the drawings by numerals, 10 designates a tool handle which may be of any suitable configuration adapted to conveniently fit in the hand to provide a grip for supporting and operating small tools, such as files. The handle 10 is provided with an axial bore or opening 11 adapted to receive the tang 12 of a tool, such as a file 13, disclosed in the present instance. The tang 12 is of the conventional type with flat sides and edge portions, and the device of this invention is adapted to cut threads in the edge portions of the tang 12 for anchoring the same in the handle.

The end of the handle 10 is provided with a counter-bore adapted to receive a casing or thimble 14 therein, the casing being formed of a pair of complemental sections of semi-cylindrical form adapted to fit snugly in the counter-bore of the handle. The casing or thimble 14 has upon its outer end, and upon each of its sections, an outstanding semi-circular flange 15 adapted to abut against the end of the handle 10 and is provided at opposite edges with outstanding ribs 16 for entering diametrically opposed slots 17 formed longitudinally in the end of the handle and opening into the counter-bore. The slots 17 are of a width equal substantially to twice the thickness of each rib 16 so that when the casing sections are assembled and the ribs 16 brought together the ribs may be inserted in pairs in the slots 17. The ribs 16 when in the slots not only hold the casing sections together, but also prevent the turning of the casing in the counter-bore. The casing 14 is provided at its forward end with radial recesses 18 which may be formed by beveling the meeting ends of the flanges 15 to form the recesses 18 between the flanges 15 when the casing sections are brought together. By beveling the ends of the flanges 15 the recesses 18 are formed with outwardly diverging walls for a purpose which will hereinafter appear. The inner end of the casing 14 is provided with a recess 19 preferably formed by cutting away the sections at the inner ends of the ribs 16, so that when the sections are assembled a recess 19 of substantial width will be provided.

The thread cutting element is in the form of a length of rod or wire substantially rectangular in cross section. The rod is wound spirally on an edge to form a spiral thread cutter 20 having an inwardly directed sharp spiral edge extending from end to end of the cutter 20 and which, when the wire or rod is case-hardened, forms a sharp cutting edge adapted to form threads in the opposite edges of the tang 12 when the latter is forced and turned into the end of the handle 10. The spiral cutter 20 has its opposite ends bent radially outward to form anchoring fingers 21 adapted to enter the recesses 18 and 19 in the opposite ends of the casing 14 to hold the spiral cutter 20 firmly in the casing and from turning. Of course, the spiral cutter 20 may be uniform or tapering in diameter to meet the conditions found in the construction of the tangs 12 of different tools, but preferably the spiral cutter tapers gradually in diameter from its outer to its inner end as the tang 12 of the file shown is of tapering form.

The casing 14 is held in the counter-bore of the handle 10 by a ferrule 22 adapted to encircle the end of the handle 10 and provided with an inturned flange 23 adapted to overlap the flanges 15 of the casing and the outer finger 21 of the cutting member 20 for holding the cutting member 20 in its recess 18 and for holding the casing from longitudinal displacement from the counter-bore and the anchoring slots 17. After the parts are assembled, the ferrule 22 may be pressed inward, as at 24, to form an annular bead in the ferrule engaging in the outer side of the handle 10. This bead 24 securely anchors the ferrule on the handle and prevents displacement of the assembled parts carried in the handle.

The anchoring fingers 21 of the cutting member 20 present edge portions and oppositely diverging faces adapted to seat firmly in the recess 18 so that the thread cutting member 20 is firmly held in its casing and against vibration or becoming loose incident to usage of the tool.

In application of the handle to a tang 12, the tang is inserted through the opening in the handle 10 and is pressed against the case-hardened spiral cutting edge of the member 20 and turned therein. This pressure and turning of the tang causes the hardened cutting edge to bite into the edges of the tang and cut a spiral thread in the edges which not only admits the advancing of the tang into the handle but which also effectively holds the tang after it has been turned up tightly into the handle. The spiral cutting edge of the member 20 is case-hardened not only to effect the forming of threads in the edges of the tang 12, but also to afford a strong retaining means to prevent accidental displacement under vibration of the tang from the handle.

Another feature of the invention is to provide a cutting element which is of coil or spiral form and which, even though hardened, possesses sufficient elasticity or resiliency for binding against the tang and thus frictionally interlocking the threads of the tang with the threads of the cutting member.

In making up the handle, it is apparent that the casing sections may be assembled about the spiral cutting member 20 with the anchoring fingers 21 in the recesses 18 and 19, and the assembled parts may thus be inserted in the counter-bore of the handle, forcing the ribs 16 into the radial slots 17 of the handle to hold the casing sections firmly together and against turning in the handle. The ferrule 22 may now be slipped over the end of the handle to hold the casing in place and to bind the outer finger 21 in its slot or recess 18. When the parts are thus assembled, the ferrule is pressed in or beaded to lock the ferrule in place.

What is claimed is:—

1. A handle for tools provided with an elastic thread cutting element formed of coiled wire and adapted to receive and cut threads in the end of a tool.

2. A handle for tools comprising a body having a bore for the reception of the shank of a tool, and a spring formed of coiled wire hardened to cut into the edges of such shank and arranged with the opening of the coil in line with the bore of the handle body, the coil being anchored to said handle body.

3. A handle for tools provided with a spirally formed rod angular in cross section forming a socket for the reception of the end of a tool and having an inwardly projecting edge case-hardened for cutting a thread in the end of the tool.

4. A handle for tools provided with an elastic spiral cutting member formed of coiled wire and having an inwardly directed cutting edge adapted to receive the end of a tool and cut threads therein and bind frictionally thereagainst.

5. A handle for tools comprising a body having a bore for the reception of the shank of a tool, and a spring formed of coiled wire hardened to cut into the edges of such shank and arranged with the opening of the coil in line with the bore of the handle body, the coil being anchored to said handle body and being tapered to correspond with the taper of such shank.

6. A handle for tools comprising a body portion having an opening therein to receive the end of a tool, a spiral rod angular in cross section and case-hardened providing a spiral thread cutting edge, a casing adapted to inclose the spiral member and to fit in the opening of the handle, said casing having anchoring means interlocking with the handle, and said spiral member having interlocking means engaging the casing whereby the casing and spiral member are held from turning in the handle, and a ferrule secured over the end of the handle and having a portion adapted to engage the casing and spiral member for maintaining the same in the handle.

7. A handle for tools comprising a body portion with a tool-receiving opening, a spiral thread cutting member formed of wire and mounted in said opening to receive the end portion of the tool therethrough and provided with an inwardly directed spiral cutting edge for forming a screw thread upon the end portion of the tool, and anchoring means arranged in the handle and housing said spiral member to prevent turning of the same and splitting of the handle.

8. A handle for tools comprising a body portion having a tang-receiving opening therein, the body portion also having a counterbore in its end with radial slots leading from the counter-bore, a two-part casing adapted to fit in the counter-bore and having ribs at their edge portions adapted to abut and fit in said slots to hold the casing together and from turning in the handle, said casing sections having semi-circular outstanding flanges adapted to engage the end of the handle and having at the meeting portions of the casing sections radiating slots, a spiral thread cutter arranged within the casing and having anchoring fingers at opposite ends seated in said radiating slots to hold the cutting member from turning in the casing, and a ferrule fitting over the end of the handle and having an inwardly directed flange adapted to overlap the flanges of the casing and the adjacent anchoring finger of the cutter to secure the same in the handle.

In testimony whereof I affix my signature in presence of two witnesses.

HEYMAN ROSENBERG.

Witnesses:
ARNOLD S. RAUNHEIM.
MINNIE HOROWITZ.